(12) United States Patent
Rust

(10) Patent No.: US 10,322,717 B2
(45) Date of Patent: Jun. 18, 2019

(54) EXPERT MODE FOR VEHICLES

(71) Applicant: GM GLOBAL TECHNOLOGY OPERATIONS LLC, Detroit, MI (US)

(72) Inventor: Ian Rust, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 140 days.

(21) Appl. No.: 15/398,454

(22) Filed: Jan. 4, 2017

(65) Prior Publication Data

US 2017/0192426 A1 Jul. 6, 2017

Related U.S. Application Data

(60) Provisional application No. 62/274,577, filed on Jan. 4, 2016.

(51) Int. Cl.
*B60W 30/00* (2006.01)
*G05D 1/00* (2006.01)
*G08G 1/00* (2006.01)

(52) U.S. Cl.
CPC ........... *B60W 30/00* (2013.01); *G05D 1/0027* (2013.01); *G08G 1/00* (2013.01); *G05D 2201/0213* (2013.01)

(58) Field of Classification Search
CPC .. B60W 30/00; B60W 40/08; B60W 2540/26; B60W 2040/0818
See application file for complete search history.

(56) References Cited

U.S. PATENT DOCUMENTS

| | | | | |
|---|---|---|---|---|
| 2014/0074338 | A1* | 3/2014 | Nordbruch | B60W 40/08 701/23 |
| 2015/0066284 | A1* | 3/2015 | Yopp | B60W 30/00 701/29.2 |
| 2015/0248131 | A1* | 9/2015 | Fairfield | G05D 1/0044 701/2 |
| 2015/0346727 | A1 | 12/2015 | Ramanujam | |
| 2015/0353033 | A1 | 12/2015 | Pribisic | |
| 2016/0249180 | A1* | 8/2016 | Li | G08G 1/096716 |
| 2016/0334797 | A1* | 11/2016 | Ross | G05D 1/0027 |
| 2018/0189717 | A1 | 7/2018 | Cao | |

OTHER PUBLICATIONS

U.S. Appl. No. 15/398,552; Non-Final Office Action—dated Mar. 27, 2018.
U.S. Appl. No. 15/398,577; NonFinal Office Action—dated Dec. 5, 2018.

* cited by examiner

*Primary Examiner* — Redhwan K Mawari
(74) *Attorney, Agent, or Firm* — Lorenz & Kopf LLP

(57) ABSTRACT

Systems and method are provided for controlling an autonomous vehicle. In one embodiment, a method for controlling an autonomous vehicle comprises determining that assistance is required for continued movement of the autonomous vehicle; and facilitating movement of the autonomous vehicle via implementation, by a processor onboard the autonomous vehicle, of manual instructions provided from a remote user that is remote from the autonomous vehicle.

20 Claims, 9 Drawing Sheets

EXPERT MODE FOR VEHICLES

CROSS-REFERENCE TO RELATED APPLICATIONS

This application claims the benefit of U.S. Provisional Application No. 62/274,577, filed Jan. 4, 2016, the entirety of which is incorporated by reference herein.

TECHNICAL FIELD

The present disclosure generally relates to vehicles, and more particularly relates to systems and methods for implementing an expert mode for autonomous vehicles in which manual instructions may be needed, for example to facilitate the autonomous vehicle's movement around an obstacle.

BACKGROUND

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While autonomous vehicles offer many potential advantages over traditional vehicles, in certain circumstances it may be difficult for an autonomous vehicle to navigate around an obstacle, for example if there are lane markings on a roadway which may interfere with a path around the obstacle.

Accordingly, it is desirable to provide systems and methods for an expert mode for improved operation of autonomous vehicles, for example that includes guiding the autonomous vehicles around objects.

SUMMARY

Systems and methods are provided for controlling an autonomous vehicle. In one embodiment, a method for controlling an autonomous vehicle comprises determining that assistance is required for continued movement of the autonomous vehicle; and facilitating movement of the autonomous vehicle via implementation, via a processor onboard the autonomous vehicle, of manual instructions provided from a remote user that is remote from the autonomous vehicle.

In one embodiment, a system for controlling an autonomous vehicle comprises a remote computer module and an autonomous vehicle computer module. The remote computer module is configured to determine that assistance is required for continued movement of the autonomous vehicle. The autonomous vehicle computer module is configured to facilitating movement of the autonomous vehicle via implementation, by a processor onboard the autonomous vehicle, of manual instructions provided from a remote user that is remote from the autonomous vehicle.

DESCRIPTION OF THE DRAWINGS

The exemplary embodiments will hereinafter be described in conjunction with the following drawing figures, wherein like numerals denote like elements, and wherein:

FIGS. 6-1 and 6-2 (also collectively referred to as FIG. 6, which includes two pages of the same flowchart, continued on the second page) is a flowchart for a control process for implementing an expert mode for an autonomous vehicle, in accordance with various embodiments.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
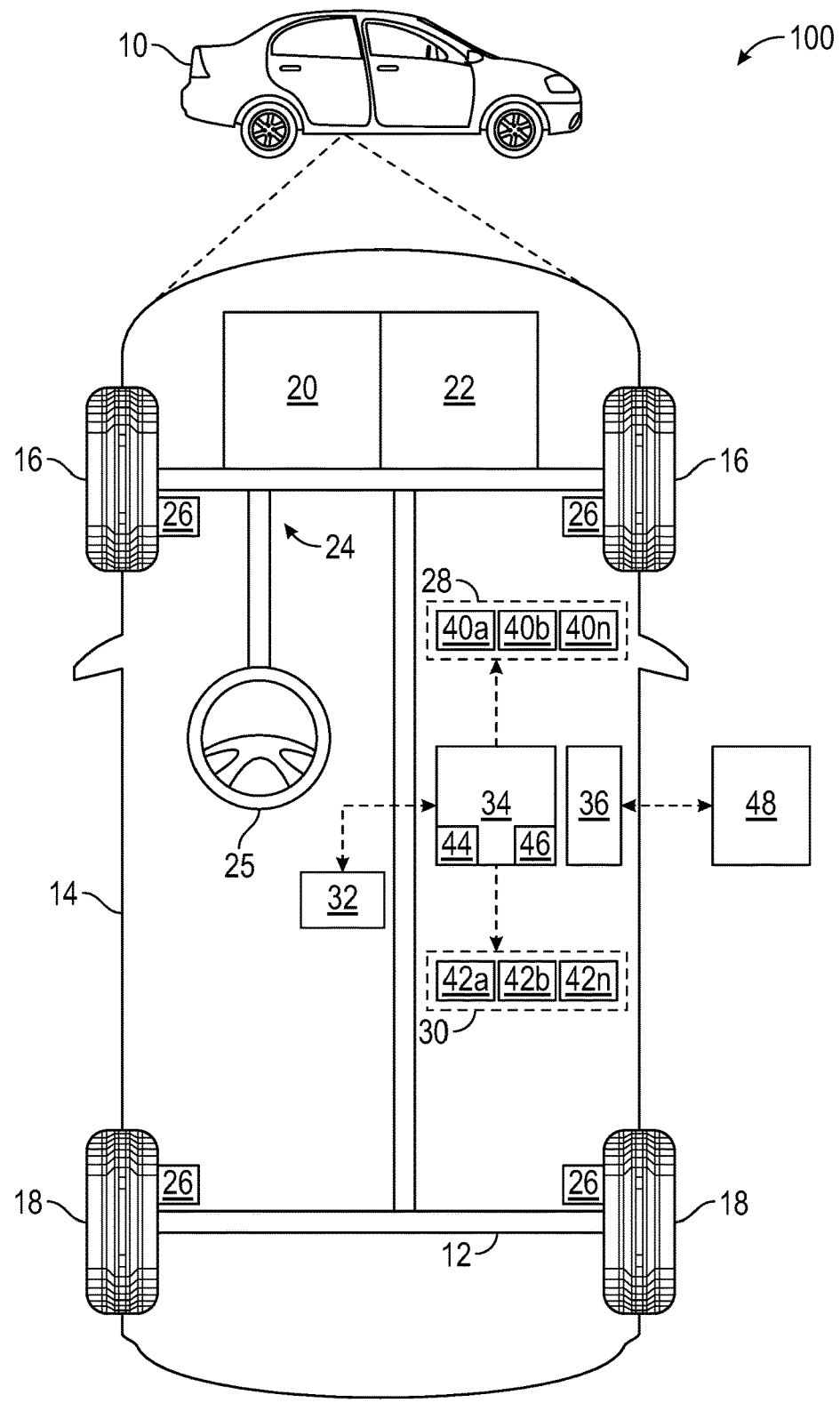
FIG. 1 is a functional block diagram illustrating an autonomous vehicle, in accordance with various embodiments.

With reference to FIG. 1, an expert mode implementation system 100 shown generally as 100 is associated with a vehicle 10 in accordance with various embodiments. In general, the expert mode implementation system (or simply "system") 100 implements manual instructions from a remote user for operation of the vehicle 10 under appropriate circumstances. As used throughout this Application, unless noted otherwise, the terms "remote user", "remote operator", and "remote individual" shall refer to a remote human individual that is disposed remote of the vehicle 10.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the expert mode implementation system 100, and/or components thereof, are incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any autonomous or other vehicle that utilizes a navigation system and/or other systems to provide route guidance and/or implementation.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n might include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In one embodiment, as discussed in detail below, controller 34 is configured for use in implementing an expert mode for controlling the vehicle 10. In one embodiment, controller 34 is configured to identify circumstances in which an expert mode may be required for the vehicle 10 for the implementation of manual instructions from a remote user for operation of the vehicle 10 under appropriate circumstances.

Figure 2:
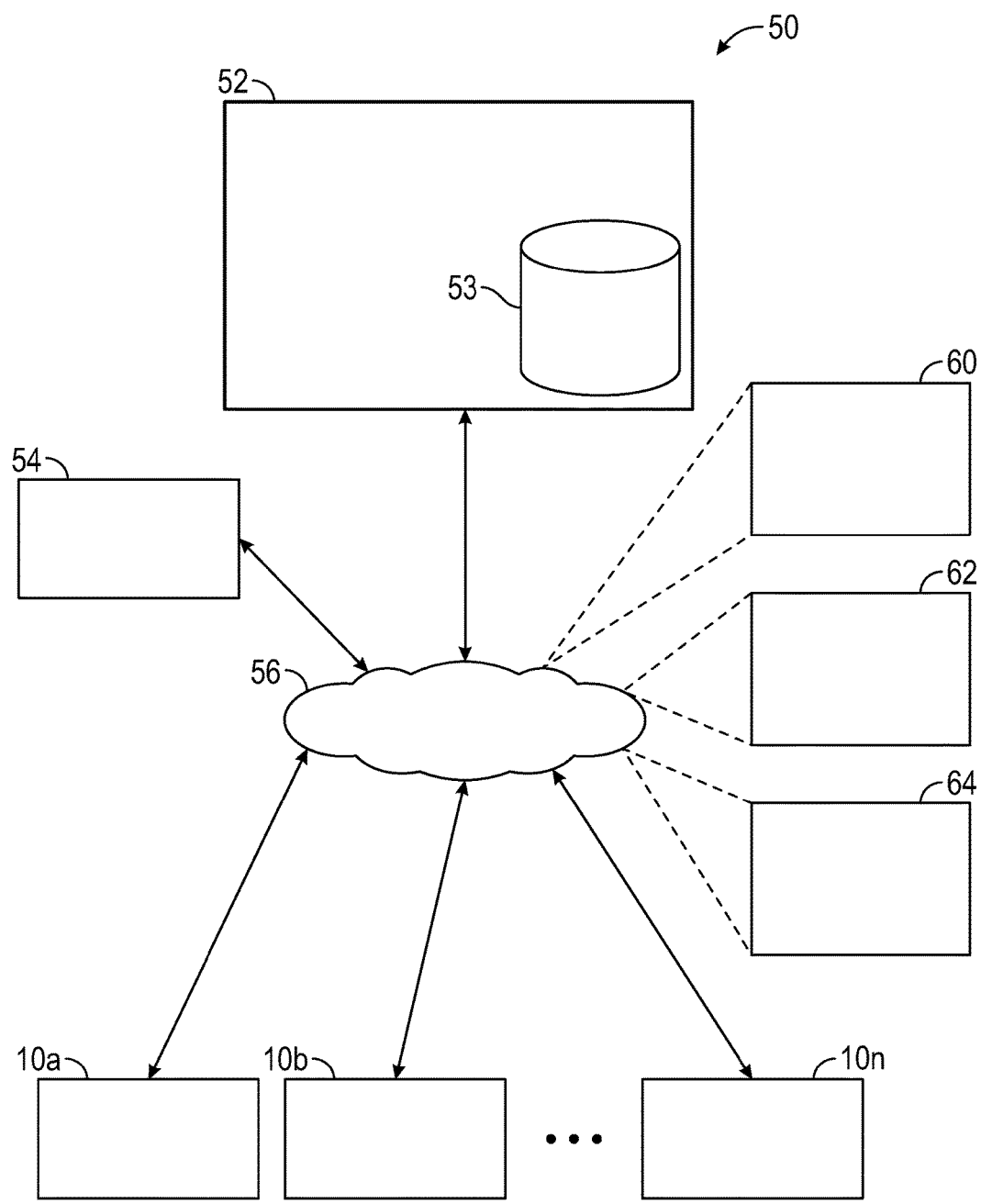
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system (or simply "remote transportation system") 52 that is associated with one or more autonomous vehicles 10a-10n as described with regard to FIG. 1. In various embodiments, the operating environment 50 (all or a part of which may correspond to entities 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, and the like) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information. In one embodiment, as described in further detail below, remote transportation system 52 includes a route database 53 that stores information relating to navigational system routes, including lane markings for roadways along the various routes, and whether and to what extent particular route segments are impacted by construction zones or other possible hazards or impediments that have been detected by one or more of autonomous vehicles 10a-10n.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
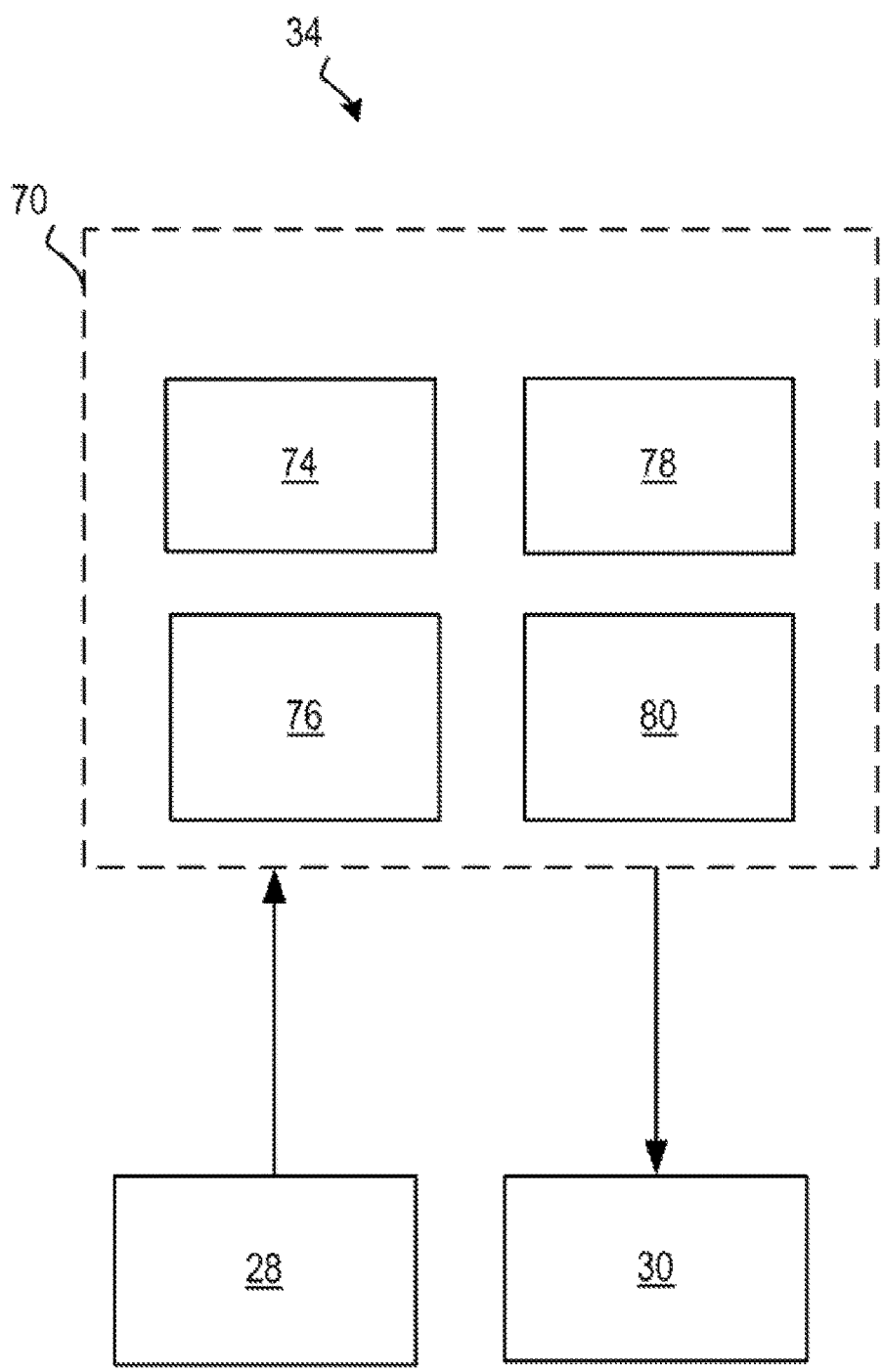
FIG. 3 is functional block diagram illustrating an autonomous driving system (ADS) associated with an autonomous vehicle, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

With reference back to FIG. 1, in various embodiments, one or more instructions of the controller 34 are embodied in the expert mode implementation system 100 of FIG. 1. The expert mode implementation system 100, when executed by the processor 44, processes data pertaining to expert mode implementation and implements manual instructions from a remote user for operation of the vehicle 10 under appropriate circumstances.

Figure 4:
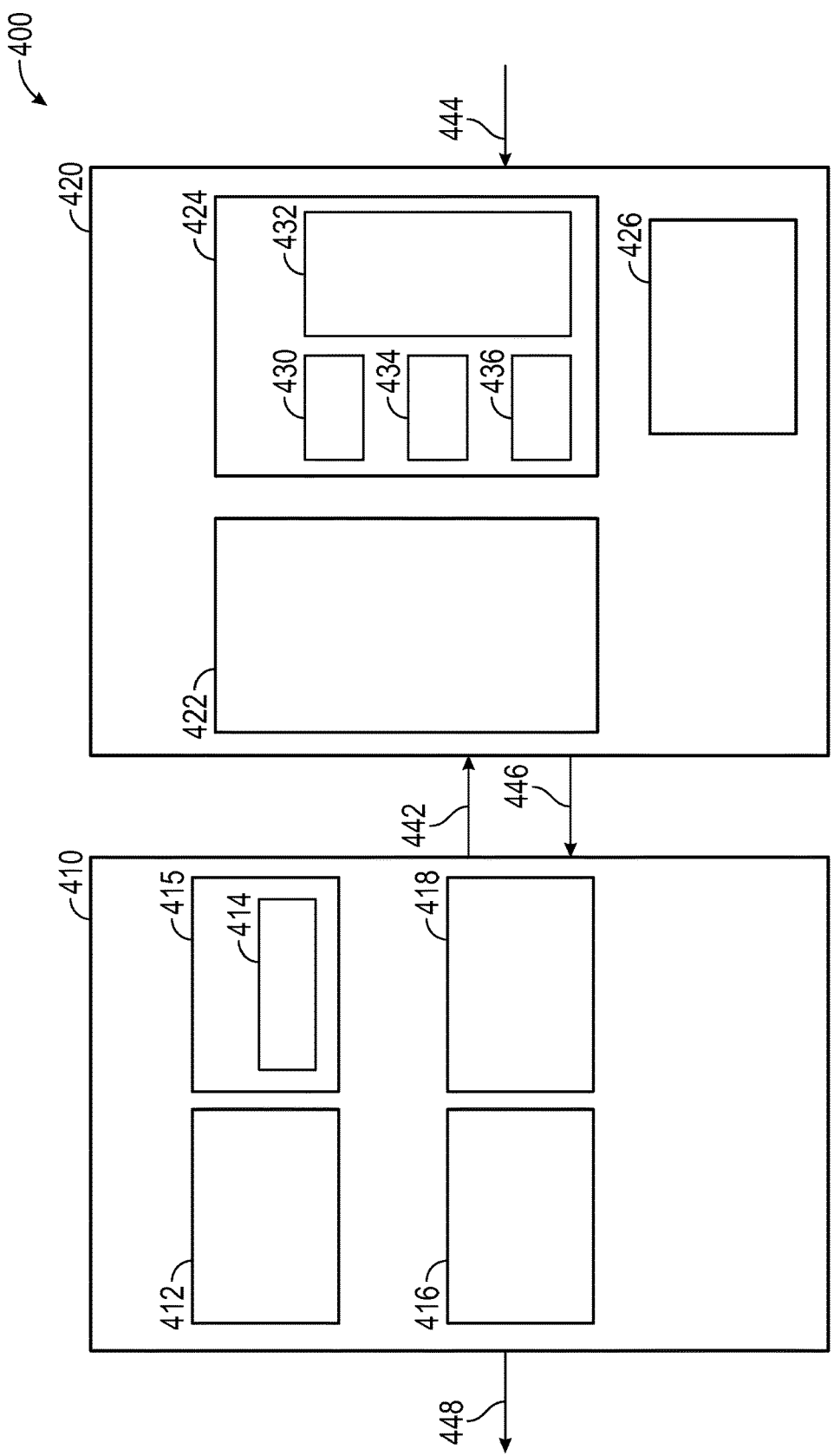
FIG. 4 is a dataflow diagram illustrating an expert mode system for autonomous vehicles, in accordance with various embodiments.

Referring to FIG. 4, an exemplary expert mode implementation system 400 generally includes an autonomous vehicle computer module 410 and a remote computer module 420. In the depicted embodiment, the autonomous vehicle computer module 410 is disposed onboard on the vehicle 10, for example as part of the controller 34 of FIG. 1 and/or one or more other associated computer systems and/or devices. Also in the depicted embodiment, the remote vehicle computer module 410 is disposed remote from the vehicle 10, for example as part of the autonomous vehicle based remote transportation system 52 of FIG. 2. In various embodiments, the remote computer module 420 initiates implementation of an expert mode for vehicle operation based on data and information provided by the autonomous vehicle computer module 410. Also in various embodiments, the autonomous vehicle computer module 410 implements the expert mode based on manual instructions provided from a remote operator via the remote computer module 420.

In various embodiments, the autonomous vehicle computer module 410 includes one or more sensors 412, interfaces 414 (e.g., including one or more input devices 415), processors 416, and/or transceivers 418 as depicted in FIG. 4. In various embodiments, the autonomous vehicle computer module 410 provides information and/or data for determining whether circumstances warrant use of an expert mode for the vehicle 10, in which manual instructions for a remote user are implemented for the vehicle 10.

In certain embodiments, the sensors 412 include one or more sensors 40a, 40b, . . . 40n of FIG. 1 (such as radar, lidar, sonar, cameras, and the like) that are configured to detect obstacles in proximity to the vehicle 10 and/or patterns of movement of such objects in proximity to the vehicle 10, for use in determining whether initiation of the expert mode is appropriate. Also in certain embodiments, the interface 414, such as the input device 415 thereof, receives inputs from an occupant of the vehicle 10 with a request to implement the expert mode (e.g. via the occupant's inputs via the input device, such as a touch screen or microphone of the vehicle 10, and/or via the occupant's user device 54 of FIG. 2).

Also in certain embodiments, the processor 416 is configured to make determinations (e.g. using sensor data) that may be used in determining whether initiation of the expert mode is appropriate. In addition, in various embodiments, when the expert mode is initiated, the processor 416 facilitates implementation of manual instructions for the expert mode, for example by generating draft alternate paths for vehicle movement utilizing the manual instructions.

In addition, in various embodiments, the transceiver 418 facilitates communication between the autonomous vehicle computer module 410 and the remote computer module 420. For example, in certain embodiments, the transceiver 418 provides data to the remote computer module 420 for use in determining whether initiation of the expert mode is appropriate (e.g., including any inputs from the interface 414, data from the sensors 412, and/or associated determinations from the processor 416). In certain embodiments, the transceiver 418 also provides video footage (e.g. footage obtained from various cameras of the sensors 412 with various views around the vehicle 10) and related information (e.g. regarding operation of various vehicle systems) to the remote computer module 420. Also in certain embodiments, the transceiver 418 receives manual instructions via the remote computer module 420, and provides proposed alternate paths for the vehicle 10 to the remote computer module 420 for confirmation when expert mode is implemented. In various embodiments, the transceiver 418 communicates with the remote computer module 420 via the communication network 56 of FIG. 2 (e.g. via one or more wireless carriers and/or systems thereof).

In various embodiments, the remote computer module 420 includes one or more processors 422, interfaces 424, and transceivers 426 as depicted in FIG. 4. In various embodiments, the remote computer module 420 initiates the expert mode in appropriate circumstances, and facilitates movement of the vehicle 10 while in the expert mode via manual instructions provided from a human remote operator for implementation by the autonomous vehicle computer module 410.

In certain embodiments, the processor 422 determines whether or not the implementation of the expert mode is appropriate based on information provided by the autonomous vehicle computer module 410 (e.g., based on a user request provided via the interface 414, and/or using obstacle detection from the sensors 412, initial determinations provided via the processor 416 regarding delay of movement of the vehicle 10, and/or movement patterns of the vehicle 10 and/or nearby obstacles, along with video footage and/or other information provided via the transceiver 418).

In various embodiments, the interface 424 facilitates the issuance of manual instructions provided by a remote, human operator for the expert mode. For example, in various embodiments, the interface 424 provides the remote operator with data pertaining to the current operation of the vehicle 10 (including video footage, any associated audio, and systems operational data) via a display 430. In various embodiments, the display 430 includes a visual component 434, such as a display screen (e.g. an LCD display screen). Also in certain embodiments, the display 430 may also include an audio component 436 (e.g. with associated audio for the video footage, and/or for an audio description of the possibility of expert mode implementation, and so on). In addition, in various embodiments, the interface 424 also includes one or more input devices 432 (e.g., including joysticks, keyboards, touch screens, steering wheels, computer mice, microphones, and so on) for the remote user to provide inputs, for example to confirm the need for an expert mode, approve of proposed alternate paths for the vehicle 10, confirm exit from the expert mode, and so on.

Also in various embodiments, the transceiver 426 facilitates communication between the remote computer module 420 and the autonomous vehicle computer module 410. For example, in certain embodiments, the transceiver 426 provides the remote operator's manual instructions to the autonomous vehicle computer module 410 for implementation on the vehicle 10. Also in certain embodiments, the transceiver 426 provides additional information from the remote operator (such as confirmation of initiation of, or exit from, the expert mode) to the autonomous vehicle computer module 410.

With further reference to FIG. 4, in various embodiments outputs 442 from the autonomous vehicle computer module 410 serve as inputs for the remote computer module 420. In various embodiments, such outputs 442 from the autonomous vehicle computer module 410 include video footage surrounding the vehicle 10, sensor data from the sensors 412 (e.g. pertaining to obstacles detected in proximity to the vehicle 10 and/or movement of the vehicle 10 and/or the obstacles), inputs from an occupant of the vehicle 10 via the interface 414 (e.g. a request for expert mode), initial determinations from the processor 416 (e.g. as to any delays in movement of the vehicle 10), and/or proposed alternate routes for the vehicle 10, for example as provided via the transceiver 418.

Also with further reference to FIG. 4, the remote computer module 420 also receives additional inputs 444 from a remote user. In various embodiments, the additional inputs 444 include the remote user's confirmation that the expert mode is warranted. The remote computer module 420 provides outputs 446 that include, in various embodiments, manual confirmation that the expert mode is initiated, along with manual instructions, and confirmations regarding entry to and exit from the expert mode, that serve as inputs for the autonomous vehicle computer module 410. The autonomous vehicle computer module 410 and the remote control also provide additional respective outputs 442, 446, respectively, to one another, for example that may include the autonomous vehicle computer module 410 providing an alternate path for the vehicle 10 as an output 442, which is then confirmed by a remote user via inputs 444 to the remote computer module 420, with a confirmation transmitted as an output 446 from the remote computer module 420 to the autonomous vehicle module 410. Also in various embodiments, the autonomous vehicle computer module 410 ultimately provides outputs 448 (e.g., to the transmission system 22, steering system 24, brake system 26, actuator system 30 of FIG. 1, and/or other vehicle systems) for control of the vehicle 10 along the confirmed alternate path.

Figure 5:
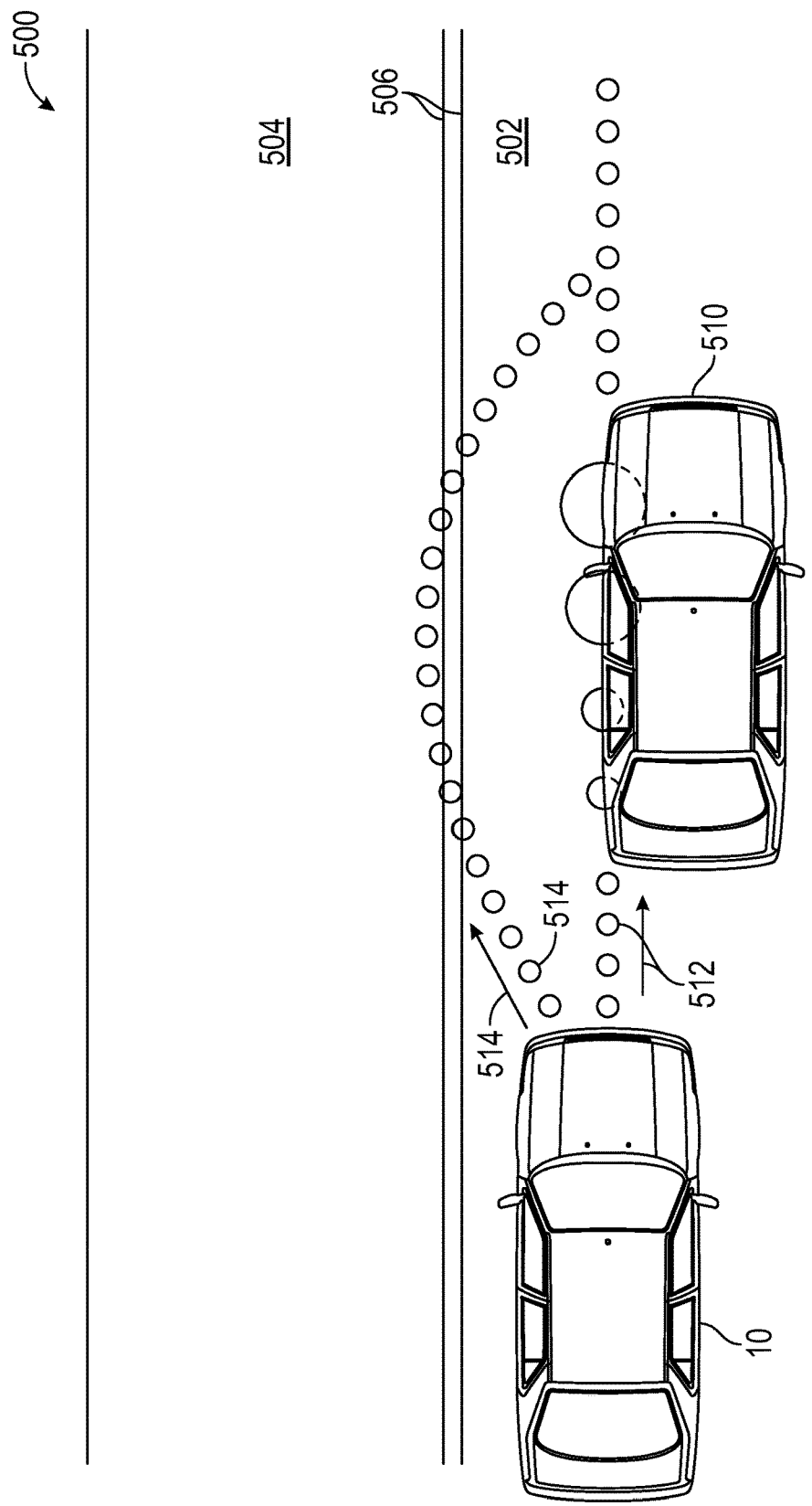
FIG. 5 is a schematic diagram of a an autonomous vehicle on a roadway with an obstacle in its path, in accordance with various embodiments.

Turning now to FIG. 5, a schematic diagram is provided of the autonomous vehicle 10 on a roadway 500, in which the expert mode may be utilized, in accordance with various embodiments. In the depicted embodiment, the roadway has a first lane 502 in which the vehicle 10 is moving, along with an adjacent lane 504. The lanes 502, 504 are separated by lane markers 506 (e.g., a double yellow line).

As depicted embodiment, the vehicle 10 is initially travelling along initial path 512 in the first lane 502. However, an obstacle 510 is detected that would block the initial path 512. Accordingly, an alternate path 514 is ultimately proposed for the vehicle 10 to travel around the obstacle 510. However, the alternate path 514 would require the vehicle 10 to travel through or past the lane markers 506 (e.g. the double yellow line). Accordingly, the expert mode would be utilized, including the use of manual instructions from a human remote user, for planning and execution of the vehicle 10's movement along the alternate path 514.

Figures 1, 6:
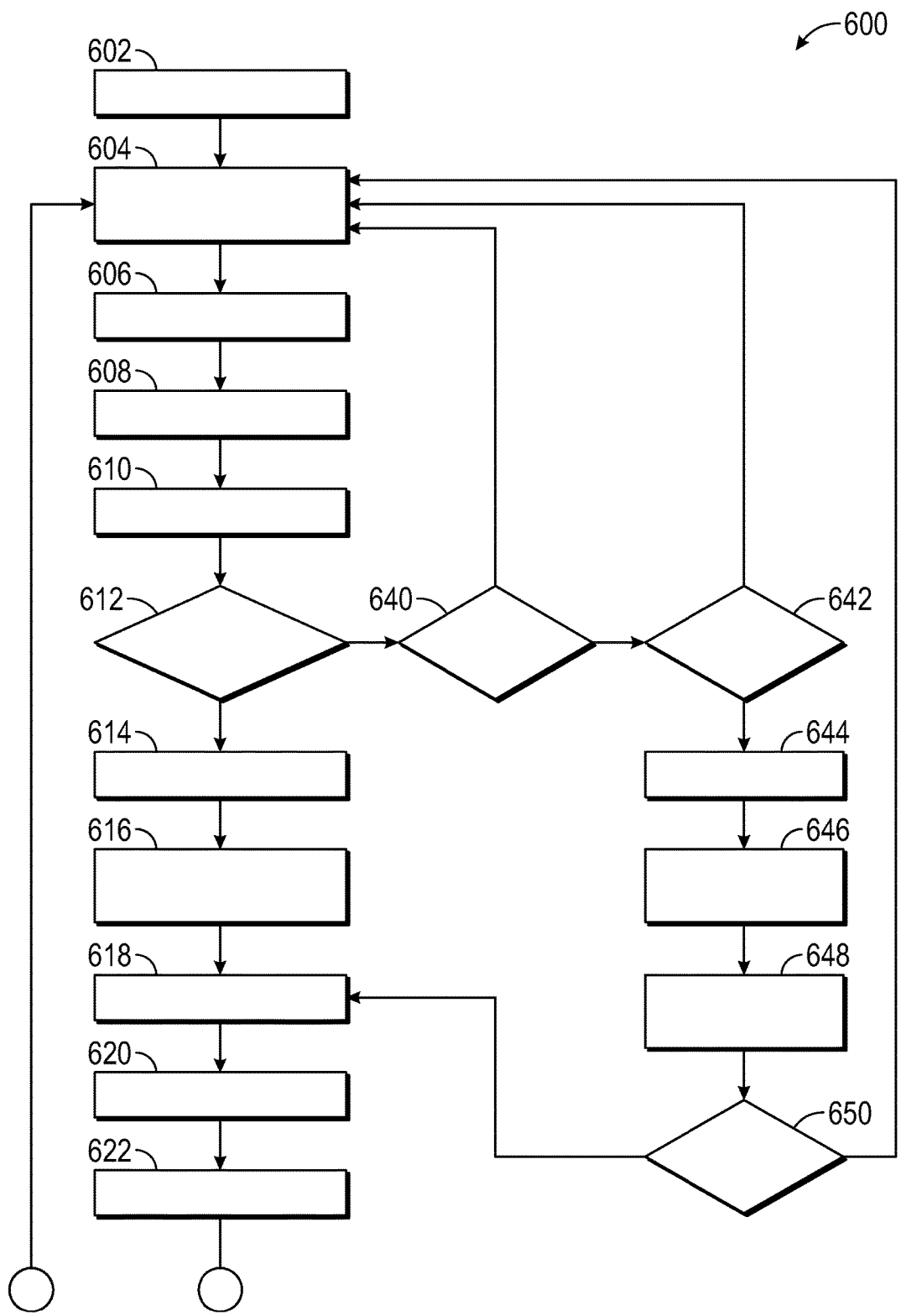
Figures 2, 6:
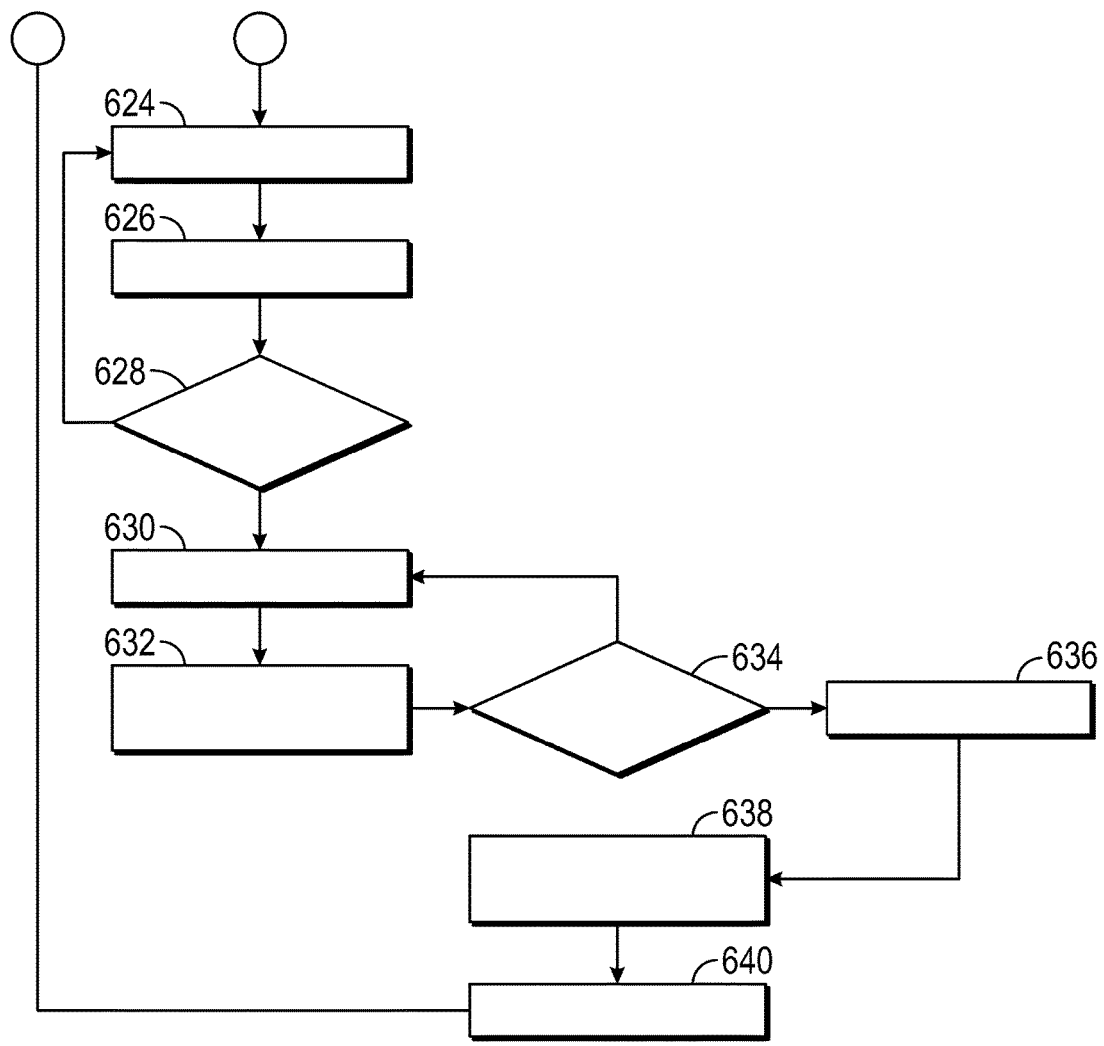

Referring now to FIG. 6, a flowchart is provided for a control method 600 for operating an autonomous vehicle using an expert mode, in accordance with various embodiments. The control method 600 is discussed below in connection with FIG. 6 as well as continued reference to FIGS. 1-5 as well as FIGS. 7 and 8. In various embodiments, the control method 600 can be performed by the system 100 and the associated implementations of FIGS. 1-5 and FIGS. 7-8, in accordance with exemplary embodiments. As can be appreciated in light of the disclosure, the order of operation within the method is not limited to the sequential execution as illustrated in FIG. 6, but may be performed in one or more varying orders as applicable and in accordance with the present disclosure. In various embodiments, the control method 600 can be scheduled to run based on one or more predetermined events, and/or can run continuously during operation of the autonomous vehicle 10.

In various embodiments, the control method 600 may begin at 602. In various embodiments 602 occurs when an occupant is within the vehicle 10 and the vehicle 10 begins operation in an automated manner.

Sensor data is obtained at 604. In various embodiments, various sensors 412 of the autonomous vehicle computer module 410 (e.g. corresponding to sensors 40a, 40b, ... 40n of FIG. 1) obtain detection data regarding obstacles in proximity to the vehicle 10 (e.g., via lidar, radar, sonar, camera, and/or other sensors). Also in various embodiments, other sensors 412 (e.g. cameras onboard the vehicle 10) obtain images and video footage surrounding the vehicle 10. In addition, in various embodiments, other sensors 412 (e.g. wheel speed sensors, accelerometers, GPS devices, and the like) track movement of the vehicle 10 and/or parameters pertaining to operation of various vehicle systems.

Map data is obtained at 606. In various embodiments, map data is retrieved from a memory, such as the data storage device 32 of FIG. 1 onboard the vehicle 10 and/or the remote route database 53 of the autonomous vehicle based remote transportation system 52 of FIG. 2.

In certain embodiments, passenger inputs are obtained at 608. In various embodiments, the passenger inputs pertain to a desired destination for travel via the vehicle 10. Also in certain embodiments, the passenger inputs may include a request by the vehicle occupant for implementation of an expert mode for a remote user to facilitate manual instructions for control of the vehicle 10. In various embodiments, the user inputs may be obtained via the input device 415 of FIG. 4 and/or the user device 54 of FIG. 2.

An initial path for the autonomous vehicle is generated and implemented at 610. In various embodiments, the initial path is generated and implemented via the ADS 70 of FIG. 3 for the vehicle 10 of FIG. 1 using the passenger inputs of 608, the map data of 606, and the sensor data of 604, for example via automated instructions provided by the processor 416. In various embodiments, the initial path of 610 comprises a path of movement of the vehicle 10 that would be expected to facilitate movement of the vehicle 10 to the intended destination while maximizing an associated score and/or desired criteria (e.g. minimizing driving time, maximizing safety and comfort, and so on).

A determination is made at 612 as to whether a request has been made for assistance. In one embodiment, the processor 422 of FIG. 4 (e.g. corresponding to a processor of the autonomous vehicle based remote transportation system 52 of FIG. 2) determines that an occupant of the vehicle 10 has requested assistance upon receiving a notification (e.g., via transceivers 418, 426 of FIG. 4) that an occupant of the vehicle 10 has provided a request for expert mode assistance via the input device 415 of FIG. 4 and/or the user device 54 of FIG. 2.

If it is determined at 612 that the user has requested assistance, then a determination is made at 614 that assistance is needed. In one embodiment, this determination is also made by the processor 422 of FIG. 4.

Video feeds and vehicle information are provided at 616 from the autonomous vehicle computer module 410 to the remote computer module 420 via transceivers 418, 426 (e.g. corresponding to outputs 442 of FIG. 4). In various embodiments, the video feeds and information include video footage of in front of, behind, to the passenger side, and to the driver side of the vehicle, along with object detection information pertaining to any obstacles in the path of or otherwise in proximity to the vehicle 10, and also along with vehicle system and operational information (e.g., including the initial path, the lanes, a centerline of the current lane, the lane markers, vehicle speed and gear data, data as to any error messages, and the like), and/or any other pertinent information and data. In various embodiment, the video feeds and data are displayed for a remote operator (e.g. at the autonomous vehicle based remote transportation system 52 of FIG. 2) via the display 430 of FIG. 4. Also in various embodiments, the video feeds and information are provided throughout the expert mode process, preferably continuously.

Figure 7:
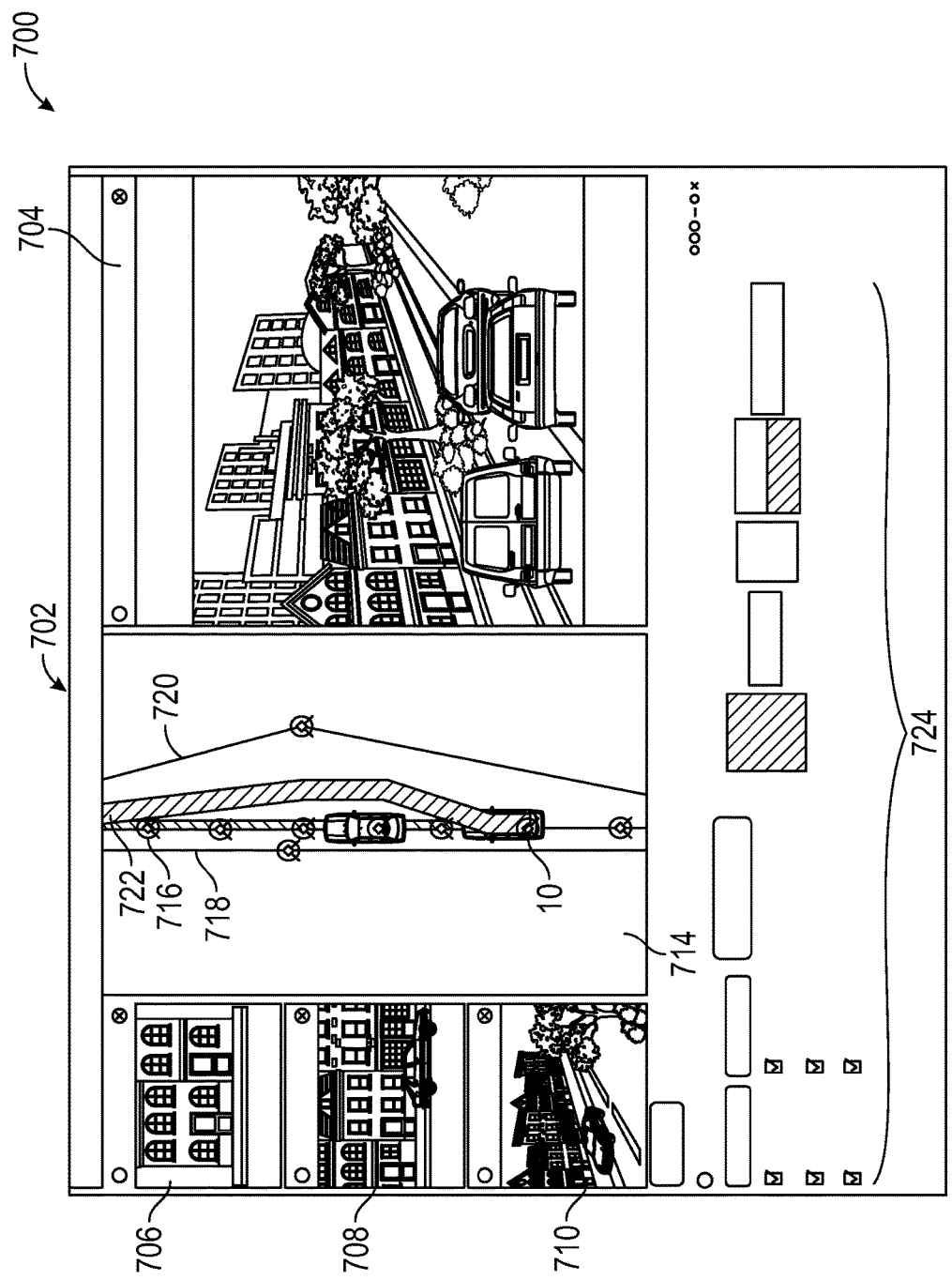
FIGS. 7 and 8 are schematic diagrams of exemplary displays associated with the control process of FIG. 6, in accordance with various embodiments.
Figure 8:
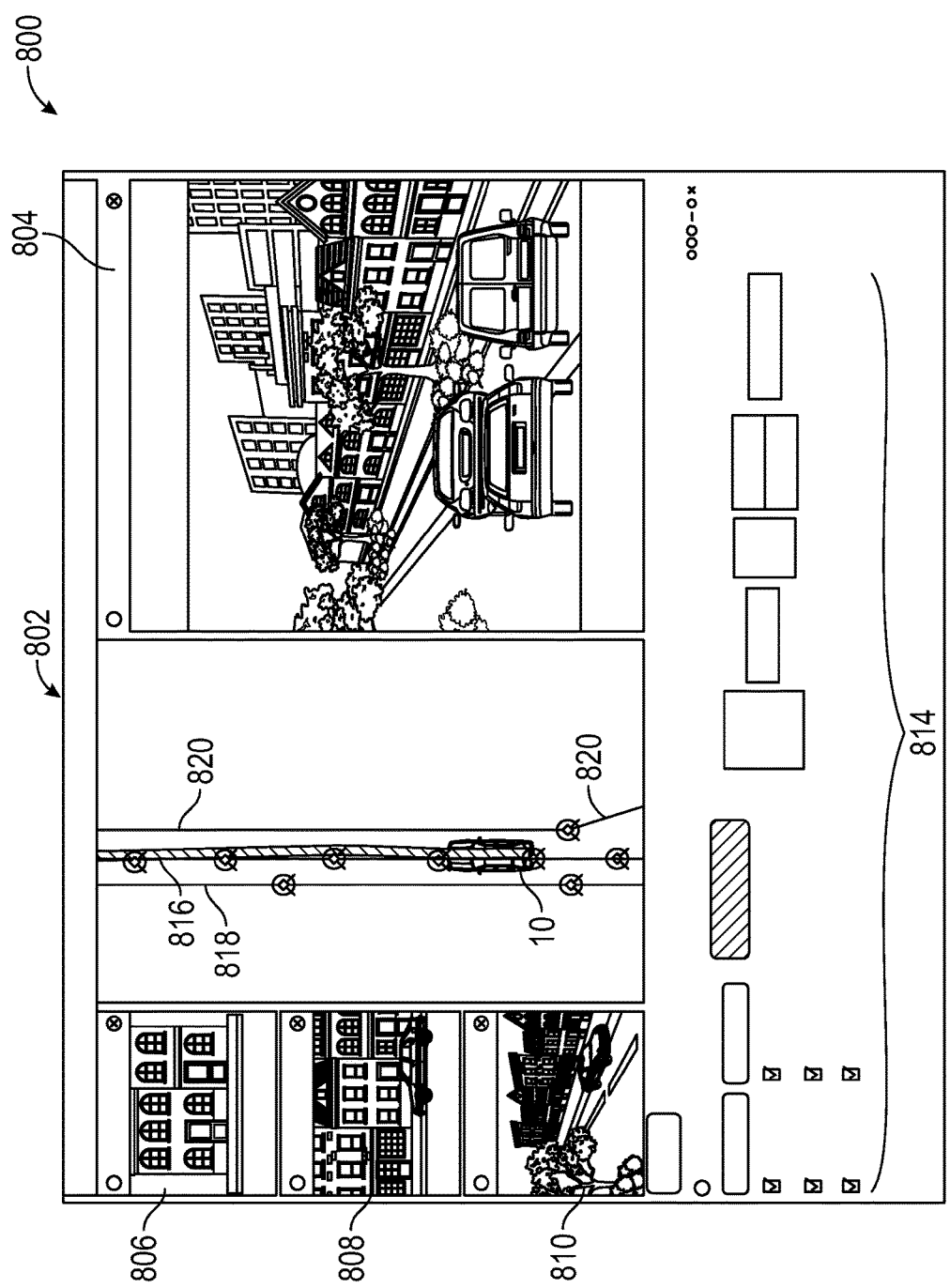

With reference to FIG. 7, in one embodiment the vehicle information of 616 comprises information 700 that includes a screen display 702 showing positon and movement of the vehicle 10 with respect to the roadway on which the vehicle 10 is travelling. In one embodiment, the screen display 702 depicts the vehicle 10, along with an obstacle 714 (e.g. corresponding to obstacle 510 of FIG. 5), along with an initial path 716 for the vehicle 10, lane markings 718, 720 for the roadway. In certain embodiments, the screen display 702 may ultimately also include a revised path 722 for the vehicle 10 (e.g., when a constraint for lane marking 720 is re-drawn, for example by a remote operator). Also as depicted in FIG. 7, in various embodiments, the vehicle information of 616 also includes front video footage 704

(i.e. with a view in front of the vehicle 10), driver side video footage 706 (i.e., with a view toward the driver side of the vehicle 10), passenger side video footage 708 (i.e., with a view toward the passenger side of the vehicle 10), and rear video footage 710 (i.e., with a view behind the vehicle 10), along with various vehicle system data 724 (e.g., including, by way of example, expert mode status, vehicle speed, amount of time that vehicle has not been moving, operational status of various vehicle sensors, actuators, and systems, and so on).

With reference again to FIG. 6, the vehicle is placed into expert mode at 618. In various embodiments, the expert mode is initiated by the processor 422 of FIG. 4.

While the vehicle is in the expert mode, a constraint is identified at 620. In various embodiments, the constraint is a feature of the roadway that would interfere with movement of the autonomous vehicle. Specifically, in one embodiment, the constraint is a feature of the roadway that would interfere with movement of vehicle 10 around an obstacle in the initial path for the vehicle 10. For example, in one embodiment, the constraint comprises the lane marker 506 (e.g., a double yellow line) of the roadway 500 of FIG. 5 that could potentially interfere with the ability of the vehicle 10 to move around the object 510 of FIG. 5 that is blocking the initial path 512 of FIG. 5.

Inputs for the constraint are obtained at 622. In various embodiments, inputs for relaxing or otherwise adjusting the constraint are obtained from the remote operator via one or more input devices 432 of FIG. 4 (e.g., corresponding to inputs 444 of FIG. 4). For example, in one embodiment in which the constraint is a double yellow line of the roadway, the inputs may comprise a virtual movement of, or a virtual re-drawing of (for planning purposes) the yellow line farther away from the vehicle 10, for example as performed manually by the remote operator using a computer mouse, joystick, touch screen, and/or other input device. For example, with reference to FIG. 7, in one embodiment a changed lane marker 720 of FIG. 7 illustrates a relaxed constraint of the lane marker. In addition, in various embodiments, the inputs for the relaxed or modified constraint (e.g. the virtual movement of the double yellow line) are transmitted from the remote computer module 420 of FIG. 4 to the autonomous vehicle computer module 410 of FIG. 4 (e.g. corresponding to outputs 446 of FIG. 4).

An alternate path is generated at 624. In various embodiments, the alternate path is generated onboard the vehicle 10 by the processor 416 of FIG. 4 using the relaxed constraints that were provided by the remote computer module 420. Also in various embodiments, the alternate path comprises a proposed route for the vehicle 10 to move around a detected obstacle utilizing the relaxed constraint. For example, with respect to FIG. 5, the alternate path 514 in this example comprises a route for the vehicle 10 to move around the obstacle 510 utilizing the relaxed constraint for the vehicle 10 to be able to move past the lane marker 506 (e.g. the double yellow line). In various embodiments, the alternate path is transmitted from the autonomous vehicle computer module 410 to the remote computer module 420 of FIG. 4 via transceivers 418, 426 (e.g., corresponding to outputs 442 of FIG. 4).

In certain embodiments, localization and mapping is still active during implementation of the expert mode. Accordingly, in certain embodiments, relative motion constraints are still processed, but may be relaxed within a range from zero percent (0%) to one hundred percent (100%) based on the inputs for the constraint obtained at 622. Also in certain embodiments, maneuverability of the vehicle 10 may be affected by this, and maneuverability may be assisted by the relaxed constraints via the heuristic if an A* (A star) algorithm is used [f(n)=g(n)+h(n), where h(n) is the heuristic function].

Approval inputs are received at 626. In various embodiments, the approval inputs comprise inputs provided by the remote operator (e.g. of the autonomous vehicle based transportation system 52 of FIG. 2) for approval or rejection of the proposed route. In various embodiments, the approval inputs are received from the remote operator via one of more input devices 432 of FIG. 4 (e.g. corresponding to inputs 444 of FIG. 4) after the remote operator has viewed continuously updated video feed and images provided by the vehicle 10 as part of continued performance of 616 (e.g. corresponding to updated information 700 of FIG. 7).

A determination is made at 628 as to whether the alternate path has been approved. In various embodiments, the processor 422 of FIG. 4 determines whether the remote operator has approved the alternate path based on the approval inputs of 626 (e.g. based on whether the remote operate has clicked on a box for "approve" or "disapprove", or one or more various other user indications of approval or disapproval).

If it is determined that the alternate path has not been approved, then the process returns to 624. Specifically, the processor 416 of FIG. 4 onboard the vehicle 10 would generate a different alternate path (e.g. based on outputs 446 of FIG. 4 received from the remote computer module 420, indicating that the alternate path has not been approved), and the process would proceed again in a new iteration from 624 using the revised alternate path.

Conversely, if it is determined that the alternate path has been approved, then the alternate path is implemented at 630. Specifically, in one embodiment, the approval of the alternate path is transmitted from the remote computer module 420 to the autonomous vehicle computer module 410 of FIG. 4 via transceivers 426, 418 (e.g. corresponding to outputs 446 of FIG. 4), and the processor 416 provides instructions for various vehicle systems (e.g., to the transmission system 22, steering system 24, brake system 26, actuator system 30 of FIG. 1, and/or other vehicle systems) to implement the alternate path (e.g. corresponding to outputs 448 of FIG. 4).

In certain embodiments, remote user inputs are received at 632 as to whether the vehicle has successfully implemented the alternate path. In various embodiments, the remote operator determines whether the vehicle has successfully implemented the alternate path using updated video feeds and data from 616 during and after the implementation of the alternate route, and the remote operator provides inputs to confirm the successful implementation via one or more input devices 432 of FIG. 4.

As noted above, in various embodiments, the remote user makes the additional confirmation at 632 based on viewing continued video feed and information as part of continued performance of 616. For example, with reference to FIG. 8, in one embodiment the continued vehicle information includes updated information 800 that includes an updated screen display 802 (showing an updated position of the vehicle 10 along with an updated path 816 and updated lane markings 818, 820 for the roadway), along with updated front video footage 804, updated driver side video footage 806, updated passenger updated side video footage 808, updated rear video footage 810, and updated vehicle system data 814 (e.g., including, by way of example, updated information regarding expert mode status, vehicle speed, amount of time that vehicle has not been moving, operational status of various vehicle sensors, actuators, and systems, and so on).

With reference again to FIG. 6, determination is then made at 634 as to whether the confirmation has been received. In various embodiments, the determination is made by the processor 422 of FIG. 4 based on the inputs from the remote operator at 632.

If it is determined that confirmation has not yet been received, then the process returns to 630. The process proceeds with new iterations of 630-634 until confirmation has been received.

Once a determination has been made that confirmation has been received, then in various embodiments one or more databases are updated at 636. For example, in various embodiments, the route database 53 of FIG. 2 is updated so that additional vehicles in a fleet (e.g. corresponding to vehicles 10*a*, 10*b*, . . . 10*n* of FIG. 2) can utilize the information pertaining to the expert mode as appropriate. For example, in certain embodiments, if the expert mode conditions are likely to be encountered by other vehicles travelling along the same roadway, then such information may be helpful in facilitating implementation of the expert mode for other such vehicles (e.g. if encountering an obstacle that remains in the roadway for an extended period of time, and/or for a traffic light that is not functioning for an extended period of time, and/or for a construction zone, and so on).

In addition, in various embodiments, the expert mode is terminated at 636 upon the determination of confirmation of 634. In various embodiments, the expert mode is terminated by the processor 422 of FIG. 4.

In addition, in various embodiments, return of control is made to the vehicle at 640. In various embodiments, the processor 422 of FIG. 4 returns full automatic control to the vehicle 10 (e.g. to the autonomous vehicle computer module 410 of FIG. 4), and the process returns to 604 for a new iteration.

Returning to 612, if no assistance request is received, then expert mode may still be implemented based on conditions that may be sensed and/or determined via the autonomous vehicle computer module 410 of FIG. 4.

Specifically, in various embodiments, a determination is made at 640 as to whether a condition has been detected that might warrant implementation of the expert mode. In various embodiments, this determination is made by one or more processors 416 and/or 422 of FIG. 4 utilizing sensor data obtained from the sensors 412 of FIG. 4. For example, in various embodiments, such a condition may be determined to be present at 640 if an obstacle is detected in proximity to the vehicle 10 (e.g., as detected by vehicle radar, lidar, sonar, cameras, and/or other sensors) in a manner that may impede movement of the vehicle 10 along the initial path, and/or if the vehicle 10 is not moving, and/or is not moving in a manner that is greater than a predetermined threshold speed and/or distance (e.g., as detected by wheel speed sensors, accelerometers, GPS devices, and/or other sensors).

If it is determined at 640 that no such condition is present, then the process returns to 604. The process then proceeds, beginning with 604, until such a condition is determined at 640 and/or a request is determined to have been received at 612.

Conversely, if it is determined at 640 that such a condition is present, then a determination is made at 642 as to whether an aspect pertaining to the condition has been satisfied. In various embodiments, this determination is made by one or more processors 416 and/or 422 of FIG. 4 utilizing sensor data obtained from the sensors 412 of FIG. 4. For example, in various embodiments, the aspect of the condition may be satisfied if a length of time (e.g. as measured via a timer) exceeds a predetermined threshold (e.g. if the obstacle and/or the vehicle 10 have not moved a sufficient distance over a predetermined amount of time). In certain embodiments, the aspect of the condition may be satisfied if one or more other patterns of movement have been met.

If it is determined at 642 that the aspect of the condition has been satisfied, then a determination is made at 644 that a check is needed with respect to the requirement, for a determination as to whether implementation of the expert mode is warranted. In various embodiments, this determination is made by one or more processors 416 and/or 422 of FIG. 4.

In addition, video feeds and vehicle information are provided at 646 from the autonomous vehicle computer module 410 to the remote computer module 420 via transceivers 418, 426 (e.g. corresponding to outputs 442 of FIG. 4). In various embodiments, the video feeds and information include video footage of in front of, behind, to the passenger side, and to the driver side of the vehicle, along with object detection information pertaining to any obstacles in the path of or otherwise in proximity to the vehicle 10, and also along with vehicle system and operational information (e.g., including the initial path, the lanes, a centerline of the current lane, the lane markers, vehicle speed and gear data, data as to any error messages, and the like), and/or any other pertinent information and data, similar to the above-described 616. In various embodiment, the video feeds and data are displayed for a remote operator (e.g. at the autonomous vehicle based remote transportation system 52 of FIG. 2) via the display 430 of FIG. 4, also similar to the above-described 616 (e.g. including the information 700 of FIG. 7, in one example). Also in various embodiments, the video feeds and information are provided throughout the expert mode process, preferably continuously.

Confirmation inputs are received from the remote operator at 648. In various embodiments, the remote operator (e.g. of the autonomous vehicle based remote transportation system 52 of FIG. 2) reviews the video fee and information of 646, makes a determination based thereon as to whether the expert mode is needed for this particular situation, and then provides manual inputs (e.g. corresponding to inputs 444 of FIG. 4) via one or more input devices 432 of FIG. 4 with an indication of whether implementation of the expert mode is warranted (e.g. by clicking on an "expert mode needed" versus an "expert mode not needed" box, and/or one or more other indications).

A determination is then made at 650 as to whether expert mode has been confirmed. In various embodiments, the processor 422 of FIG. 4 makes this determination based on the remote operator's manual inputs of 648. If it is determined that expert mode has been confirmed, then the process proceeds to 618, for initiation of the expert mode (e.g. based on corresponding outputs 446 of FIG. 4). Conversely, if it is determined that expert mode has not been confirmed, then the process proceeds instead to 604 (e.g. based on corresponding outputs 446 of FIG. 4).

Accordingly, the expert mode may be initiated automatically by the remote computer module 420 if a user request is determined to have been made at 612 in various embodiments. Conversely, under other circumstances in which a condition and aspect thereof are automatically determined at 640 and 642, then in various embodiments a remote user would then provide confirmation at 648 that is analyzed at 650 to determine whether or not to implement the expert mode.

In various embodiments, the disclosed methods and systems provide for implementation of an expert mode for an autonomous vehicle. The expert mode utilizes manual instructions obtained from an operator that is remote from the vehicle, for implementation by a computer system that is disposed onboard the vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling an autonomous vehicle, the method comprising:
    determining that assistance is required for continued movement of the autonomous vehicle;
    obtaining instructions, from a remote user that is remote from the autonomous vehicle, to relax a constraint of a roadway on which the autonomous vehicle is travelling that would interfere with movement of the autonomous vehicle; and
    facilitating movement of the autonomous vehicle via implementation, by a processor onboard the autonomous vehicle, of the instructions provided from the remote user that is remote from the autonomous vehicle, to thereby relax the constraint for the roadway on which the autonomous vehicle is travelling.

2. The method of claim 1, further comprising:
    determining that an obstacle is obstructing proposed movement of the autonomous vehicle along an initial path;
    wherein:
        the step of obtaining the instructions comprises obtaining manual instructions, from the remote user, to relax the constraint in facilitating movement of the autonomous vehicle around the obstacle; and
        the step of implementing the manual instructions comprises implementing the manual instructions, via the processor onboard the autonomous vehicle, to facilitate movement of the autonomous vehicle around the obstacle.

3. The method of claim 2, wherein the step of implementing the manual instructions comprises:
    generating, via the processor onboard the autonomous vehicle, an alternate path for the autonomous vehicle to move around the obstacle using the manual instructions for the relaxed constraint.

4. The method of claim 3, wherein the step of implementing the manual instructions further comprises:
    receiving manual confirmation, from the remote user, of the remote user's acceptance of the alternate path; and
    implementing the alternate path, upon receiving the manual confirmation, via instructions provided by the processor onboard the autonomous vehicle.

5. The method of claim 2, wherein:
    the step of obtaining the manual instructions comprises:
        obtaining manual instructions from the remote user to adjust a lane boundary of the roadway that would interfere with movement of the autonomous vehicle around the obstacle; and
    the step of implementing the manual instructions comprises:
        implementing the manual instructions, via the processor onboard the autonomous vehicle, to facilitate movement of the autonomous vehicle around the obstacle using the adjusted lane boundary.

6. The method of claim 1, wherein:
    the constraint comprises a lane marker for the roadway; and
    the constraint is relaxed via a virtual re-drawing of the lane marker for the roadway by the remote operator.

7. The method of claim 6, wherein:
    the constraint comprises a double yellow lane marker for the roadway; and
    the constraint is relaxed via a virtual re-drawing of the double yellow lane marker for the roadway by the remote operator.

8. The method of claim 6, wherein the virtual re-drawing of the lane marker for the roadway is performed by a human remote operator via a computer input device that is coupled to a computer device that is disposed remote from the autonomous vehicle.

9. The method of claim 6, further comprising:
    generating, via the processor onboard the autonomous vehicle, an alternative path for the autonomous vehicle, using the re-drawn lane marker for the roadway.

10. The method of claim 9, wherein the step of generating the alternative path comprises generating the alternate path using relative motion constraints, but that are more relaxed as compared with previous relative motion constraints utilized prior to the determining that assistance is required.

11. The method of claim 6, wherein the step of generating the alternative path comprises generating the alternate path using the re-drawn lane marker via a heuristic of an A star algorithm.

12. A system for controlling an autonomous vehicle, the system comprising:
    a remote computer module configured to:
        determine that assistance is required for continued movement of the autonomous vehicle; and
        obtain instructions, from a remote user that is remote from the autonomous vehicle, to relax a constraint of a roadway on which the autonomous vehicle is travelling that would interfere with movement of the autonomous vehicle; and
    an autonomous vehicle computer module configured to facilitating movement of the autonomous vehicle via implementation, by a processor onboard the autonomous vehicle, of the instructions provided from the remote user that is remote from the autonomous vehicle, to thereby relax the constraint for the roadway on which the autonomous vehicle is travelling.

13. The system of claim 12, wherein:
    the autonomous vehicle computer module is configured to detect that an obstacle is obstructing proposed movement of the autonomous vehicle along an initial path;
    the remote computer module is configured to obtain manual instructions, from the remote user, to relax the constraint in facilitating movement of the autonomous vehicle around the obstacle; and
    the autonomous vehicle computer module is further configured to implement the manual instructions, via the processor onboard the autonomous vehicle, to facilitate movement of the autonomous vehicle around the obstacle.

14. The system of claim 13, wherein the autonomous vehicle computer module is configured to generate, via the processor onboard the autonomous vehicle, an alternate path for the autonomous vehicle to move around the obstacle using the manual instructions for the relaxed constraint.

15. The system of claim 14, wherein:
the remote computer module is configured to receive manual confirmation, from the remote user, of the remote user's acceptance of the alternate path; and
the autonomous vehicle computer module is configured to implement the alternate path, upon receiving the manual confirmation, via instructions provided by the processor onboard the autonomous vehicle.

16. The system of claim 13, wherein:
the remote computer module is configured to obtain manual instructions from the remote user to adjust a lane boundary of the roadway that would interfere with movement of the autonomous vehicle around the obstacle; and
the autonomous vehicle computer module is configured to implement the manual instructions, via the processor onboard the autonomous vehicle, to facilitate movement of the autonomous vehicle around the obstacle using the adjusted lane boundary.

17. The system of claim 12, wherein:
the constraint comprises a lane marker for the roadway; and
the constraint is relaxed via a virtual re-drawing of the lane marker for the roadway by the remote operator.

18. The system of claim 17, wherein:
the constraint comprises a double yellow lane marker for the roadway; and
the constraint is relaxed via a virtual re-drawing of the double yellow lane marker for the roadway by the remote operator.

19. The system of claim 17, wherein the autonomous vehicle computer module is further configured to generate an alternative path for the autonomous vehicle, using the re-drawn lane marker for the roadway, using relative motion constraints, but that are more relaxed as compared with previous relative motion constraints utilized prior to the determining that assistance is required.

20. A system for controlling an autonomous vehicle, the system comprising:
an interface disposed remote from the autonomous vehicle, the interface configured to receive manual instructions from a remote user, who is remote from the vehicle, to relax a constraint of a roadway on which the autonomous vehicle is travelling that would interfere with movement of the autonomous vehicle, when it is determined that manual assistance is required for movement of the autonomous vehicle; and
a processor disposed onboard the vehicle, the processor configured to implement the manual instructions, utilizing the relaxed constraint, in generating a revised path for the autonomous vehicle utilizing the relaxed constraint.

* * * * *